Feb. 24, 1931. J. BUTYN 1,793,541
POTATO DIGGER
Filed March 26, 1928

INVENTOR.
J. Butyn.
BY J. Edward Maybee.
ATTY.

Patented Feb. 24, 1931

1,793,541

UNITED STATES PATENT OFFICE

JOHN BUTYN, OF NEWARK, NEW JERSEY

POTATO DIGGER

Application filed March 26, 1928, Serial No. 264,662, and in Canada July 16, 1927.

This invention relates to apparatus for digging potatoes and other root crops, and the object of my invention is to devise suitable means whereby the plow or gatherer may be vertically adjusted for crops of different depths so that it may be lowered for crops of greater depth without increasing the angle at which the plow enters the ground.

I attain my object by mounting in front of a wheeled carriage a plow adapted to lift the potatoes and guide them rearwardly and upwardly onto a vibrating platform, formed as a screen through which earth carried up with the potatoes may fall, the potatoes travelling rearwardly along the platform and deposited in a suitable receptacle. The plow is supported by a support which is vertically slidable in a vertical guide mounted on the frame.

Figure 1:
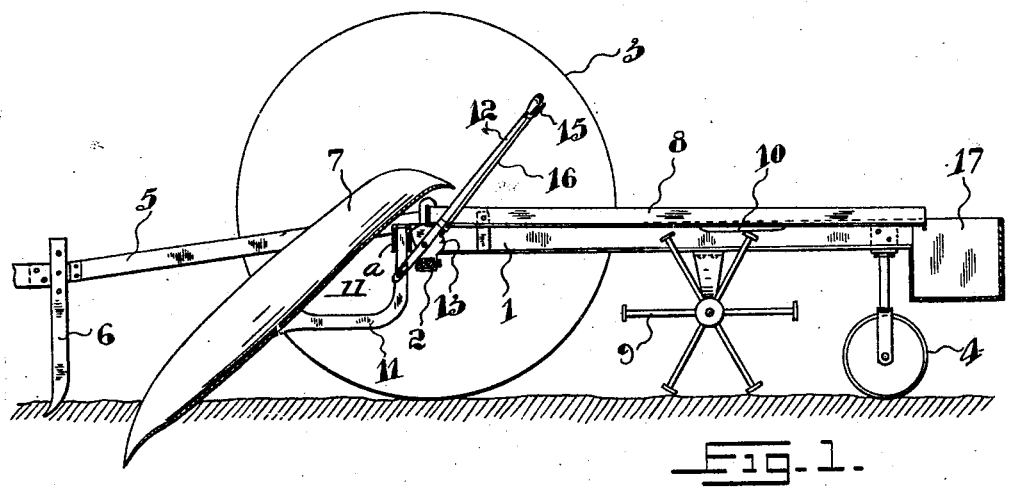
Figure 2:
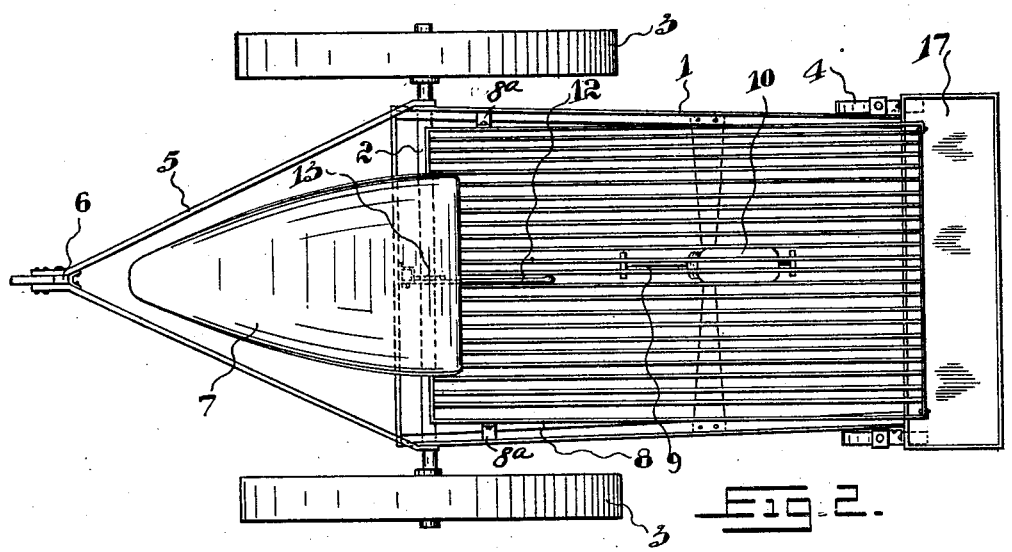

The apparatus is hereinafter more specifically described and illustrated in the accompanying drawings in which Fig. 1 is a side elevation of my apparatus;
Fig. 2 a plan view of the same; and
Fig. 3 a detail of the means for vertically adjusting the plow.

In the drawings like numerals of reference indicate corresponding parts in the different figures.

The device comprises a carriage having a frame 1 which may be formed in any desired manner. At the forward end of the frame is located an axle 2 on which are journalled ground wheels 3. The rear end of the frame is supported by a ground wheel 4.

Attached to the axle is the tongue 5 to which horses may be hitched. On this tongue is supported a hoe or colter 6 adapted to loosen the surface of the soil.

Supported at the forward end of the frame 1 is a gatherer or plow 7. This plow or gatherer is so shaped that it dips under the potatoes or other roots and picks them up and guides them up on to a platform 8 supported on the frame. This platform is formed as a screen, the openings being sufficiently small to prevent the escape of potatoes but to allow earth carried up by the plow to fall through.

The forward end of the screen or platform 8 is pivotally connected at $8^a$ with the frame and is inclined downwardly towards its rear end, the rear end being free.

It is preferable, however, to agitate the frame to remove earth which may be clinging to the potatoes, and I therefore pivot on the frame the agitator wheel 9, which is provided with a plurality of arms or projections adapted to engage a striking plate 10 on the under side of the screen. This agitator may be driven through direct contact with the ground, or may be driven by means of a gear and chain drive from one of the ground wheels. A box or receptacle 17 is supported by the frame to receive the potatoes as they are discharged from the platform.

As the potatoes or roots may be at different depths, I provide means for adjusting the vertical position of the plow to regulate the depth of the cut made thereby.

Figure 3:
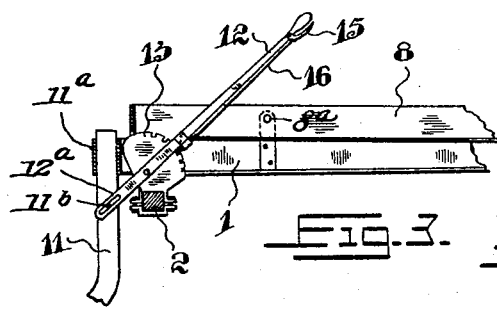

The plow is therefore mounted on a support 11 vertically movable relative to the frame in a vertical guide $11^a$. On the frame is pivoted a lever 12, one end of which is connected with the support 11, by a slot and pivot connection. In Figure 3, $12^a$ represents a slot in the lever 12, and $11^b$ a pin which extends through the slot and on which the lever 12 pivots. A toothed quadrant or ratchet 13 is provided on the frame with which is adapted to engage a spring-pressed dog or pawl mounted on the lever 12. This dog is actuated by means of a lever 15 pivoted on the lever 12 and connected with said dog by a rod 16. It will thus be seen that by rocking the lever 12 the vertical position of the plow may be varied as desired, without altering the angle at which the plow enters the ground.

From the above description it will be seen that I have devised a construction which will satisfactorily attain the object of my invention as set out in the preamble of this specification.

What I claim as my invention is:

1. In apparatus for digging potatoes and the like, the combination of a carriage; a screen mounted on and above the carriage; a gatherer adapted to discharge potatoes and earth on the screen; and means for vertically adjusting said gatherer for crops of different depths, while keeping constant the angle at which it enters the ground.

2. In apparatus for digging potatoes and the like, the combination of a carriage; a screen mounted on and above the carriage; a gatherer adapted to discharge earth and potatoes on the screen; and means for vertically adjusting the said gatherer, so that it may be lowered for gathering root crops of greater depth while keeping constant the angle at which it enters the ground.

3. In apparatus for digging potatoes and the like, the combination of a carriage; a screen mounted on and above the carriage; a vertical guide on said carriage; a gatherer adapted to discharge potatoes and earth on the screen; and a support for said gatherer, said support being vertically slidable in said guide whereby the support may be slid up or down in the guide while keeping constant the horizontal angle of the gatherer.

4. In apparatus for digging potatoes and the like, the combination of a carriage; a screen mounted on and above the carriage; a vertical guide on said carriage; a gatherer adapted to discharge potatoes and earth on the screen; a support for said gatherer, said support being vertically slidable in said guide; and a lever pivoted on the carriage and having one end pivotally connected with the support whereby the support may be slid up or down in the guide while keeping constant the horizontal angle of the gatherer.

5. In apparatus for digging potatoes and the like, the combination of a pair of wheels journalled on a common axle; a frame carried by the axle; a screen mounted on and above the frame; rear supporting wheels for the frame; a vertical guide on the frame; a gatherer adapted to discharge potatoes and earth on the screen; and a support for said gatherer, said support being vertically slidable in said guide whereby the support may be slid up or down in the guide while keeping constant the horizontal angle of the gatherer.

Signed at Newark this 24th day of February, 1928.

JOHN BUTYN.